United States Patent
Chen et al.

(10) Patent No.: US 10,171,187 B2
(45) Date of Patent: Jan. 1, 2019

(54) SYSTEM AND METHOD FOR TESTING HIGH-SPEED ADC IN DP-QPSK RECEIVER

(71) Applicant: Xiamen UX High-Speed IC Co., Ltd., Xiamen (CN)

(72) Inventors: Zhe Chen, Xiamen (CN); Xiang Xiao, Xiamen (CN); Long Zhao, Xiamen (CN); Bao Li, Xiamen (CN); Yuhua Cheng, Xiamen (CN); Quanchuan Gao, Xiamen (CN); Qiuwei Huang, Xiamen (CN)

(73) Assignee: XIAMEN UX HIGH-SPEED IC CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/703,983

(22) Filed: Sep. 13, 2017

(65) Prior Publication Data

US 2018/0278346 A1    Sep. 27, 2018

(30) Foreign Application Priority Data

Mar. 24, 2017   (CN) .......................... 2017 1 0182465

(51) Int. Cl.
*H04B 17/29* (2015.01)
*H04L 12/26* (2006.01)
*H04B 10/61* (2013.01)

(52) U.S. Cl.
CPC ......... *H04B 17/29* (2015.01); *H04B 10/6165* (2013.01); *H04L 43/0823* (2013.01); *H04L 2203/02* (2013.01)

(58) Field of Classification Search
CPC .... H04B 10/61; H04B 10/5561; H04B 10/60; H04B 10/66; H04B 1/0475; H04B 17/29; H04B 10/6165; H04L 43/0823
See application file for complete search history.

(56) References Cited

U.S. PATENT DOCUMENTS

| | | | |
|---|---|---|---|
| 2012/0269513 A1* | 10/2012 | Abe ..................... | H04B 10/532 398/65 |
| 2016/0308579 A1* | 10/2016 | Abe ........................ | H04B 3/06 |
| 2017/0338895 A1* | 11/2017 | Yasuda .............. | H04B 10/2507 |

* cited by examiner

*Primary Examiner* — Khanh C Tran
(74) *Attorney, Agent, or Firm* — Leong C. Lei

(57) ABSTRACT

A system and a method for testing a high-speed ADC in a DP-QPSK receiver are disclosed. The system includes a simulation module for outputting a data flow and performing signal recovery, an arbitrary waveform generator for receiving the data flow and outputting a high-speed analog signal and a clock signal, a high-speed ADC for converting the high-speed analog signal and the clock signal into a high-speed digital signal, a cache memory circuit for converting the high-speed digital signal into a low-speed digital signal, and a logic analyzer for sending the low-speed digital signal to the simulation module.

10 Claims, 2 Drawing Sheets

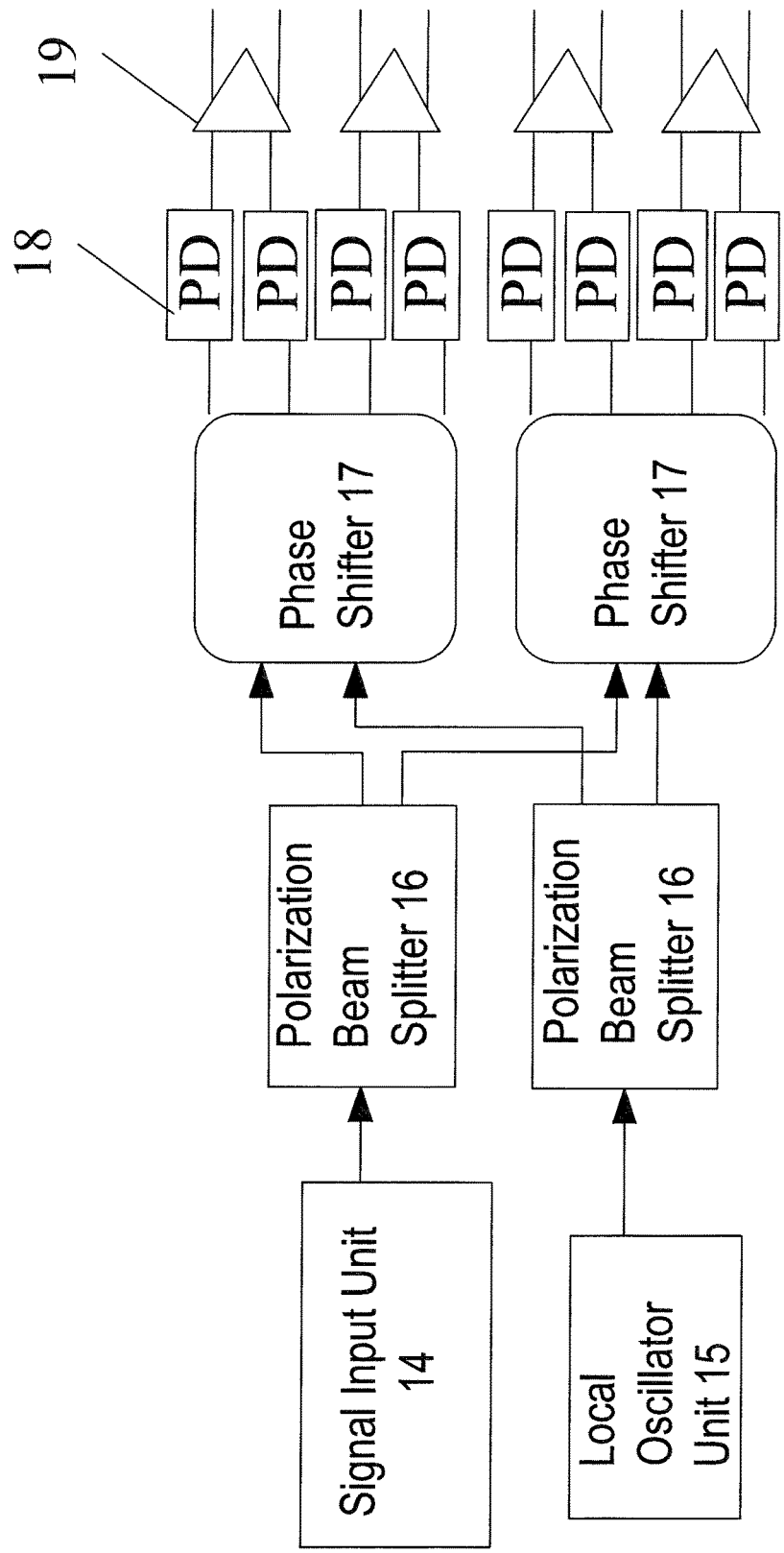
F I G. 2

SYSTEM AND METHOD FOR TESTING HIGH-SPEED ADC IN DP-QPSK RECEIVER

BACKGROUND OF THE INVENTION

1. Technical Field

The present invention relates to optical communication and fiber optic transmission systems, and more particularly to a system and a method for testing a high-speed ADC in a DP-QPSK receiver.

2. Description of Related Art

Recently, the combination of phase shift keying technology and coherent detection has provided efficient spectrum utilization. As compared to the traditional direct intensity encoding and direct detection, DP-QPSK (Dual-Polarization Quadrature Phase Shift Keying) improves every transmission wavelength in information-carrying capability significantly.

DP-QPSK encodes and demodulates signals on the principle described below. A signal is split to two when passing a polarization beam splitter, and then the two signals get coupled with two light beams of a local oscillator generated by a polarization-maintaining intensity-splitting prism in two 90° phase shifters. Each 90° phase shifter has two arms and a differential output. In the path having the local oscillator, the lower arm is one-quarter cycle longer than the upper arm. The 90° phase shifters are followed by 8 photoelectric detectors (PD) or 4 sets of balanced photoelectric detectors. What is seen in the upper arm balanced photoelectric detector is in-phase beat product, and what is seen in the lower arm balanced photoelectric detector is quadrature beat product. The differential signals generated by the balanced photoelectric detectors are converted into voltage signals by a subsequent transimpedance amplifier. The transimpedance amplifier has its differential output converted from analog to digital one and then enters the successive digital signal processing module (DSP) for data recovery. In the DSP, the most critical part is its high-speed analog-to-digital converter chip, which converts analog signals into digital signals for further algorithmic processing.

The existing methods for testing a high-speed ADC in a DP-QPSK system have innate shortcomings. For example, it is costly to build a complete high-speed DP-QPSK system with hardware, and since ADCs are usually integrated in commercial DSPs, it is difficult to test them separately. Besides, complicated FPGA algorithms have to be developed for testing.

SUMMARY OF THE INVENTION

The primary objective of the present invention is to overcome the problems of the existing approach to testing high-speed ADCs in DP-QPSK systems such as high costs and lack of separate evaluation by providing a system and a method for testing high-speed ADCs in DP-QPSK receivers.

The present invention implements the following technical schemes:

A system for testing a high-speed ADC in a DP-QPSK receiver comprising: a simulation module, for generating a DP-QPSK data flow, performing coupling and phase shift, and outputting a data flow; an arbitrary waveform generator, connected to the simulation module for receiving the data flow and outputting a high-speed analog signal and a clock signal; a high-speed ADC, connected to the arbitrary waveform generator, for converting the high-speed analog signal and the clock signal into a high-speed digital signal; a cache memory circuit, connected to the high-speed ADC, for converting the high-speed digital signal into a low-speed digital signal; and a logic analyzer, connected to the cache memory circuit, for sending the low-speed digital signal to the simulation module; wherein the simulation module receives the low-speed digital signal and performs signal recovery and compares a recovered signal to an original signal so as to realize testing.

The simulation module comprises a DP-QPSK simulation module and a Labview control module, the DP-QPSK simulation module generating the DP-QPSK data flow, performing coupling and phase shift, outputting the data flow, receiving the low-speed digital signal, and performing signal recovery and comparison; and the Labview control module realizing data communication between the DP-QPSK simulation module and the arbitrary waveform generator as well as the logic analyzer.

The DP-QPSK simulation module comprises a signal input unit, a local oscillator unit, a polarization beam splitter unit, a phase shifter unit, a photodiode unit, and a variable transimpedance amplifier unit; the signal input unit generating the DP-QPSK data flow; the local oscillator unit generating a data flow of the local oscillator laser device; the polarization beam splitter unit connected to the signal input unit and the local oscillator unit for dividing the DP-QPSK data flow and the data flow of the local oscillator laser device into two signals; the phase shifter unit connected to the polarization beam splitter unit for performing coupling and phase shift on the signals; the photodiode unit connected to the phase shifter unit for converting optical signals into electric signals; and the variable transimpedance amplifier unit connected to the photodiode unit for amplifying the signals.

Connection or data exchange between the Labview control module and the arbitrary waveform generator, and the logic analyzer, and the DP-QPSK simulation module are realized using a GPIB bus, a TCP/IP protocol and a data file, respectively.

The DP-QPSK simulation module comprises a DSP module for receiving the low-speed digital signal, performing signal recovery, and comparing the recovered signal to the original signal so as to realize testing.

The arbitrary waveform generator has a pair of analog differential signal outlets and four clock outlets, in which each two adjacent said clock outlets have a 90° phase difference therebetween.

The logic analyzer has a reading rate smaller than a maximum reading rate supported by the cache memory circuit, and the logic analyzer has a sampling rate greater than a sum of an effective number of bits of the high-speed ADC and a number of chip clocks.

The cache memory circuit has a parallel-to-serial circuit and a Flash cache.

The high-speed ADC implements a time-interleaved classification sampling structure.

A method for testing a high-speed ADC in a DP-QPSK receiver, comprising the steps of:

1) generating a DP-QPSK data flow, performing coupling and phase shift and outputting the data flow using a simulation module;

2) inputting the data flow into an arbitrary waveform generator for outputting a high-speed analog signal and a clock signal;

3) converting the high-speed analog signal and the clock signal into a high-speed digital signal using the high-speed ADC;

4) converting the high-speed digital signal into a low-speed digital signal using a cache memory circuit; and 5) sending the low-speed digital signal to the simulation module where signal recovery is performed and the recovered signal is compared to the original signal so as to realize testing.

From the foregoing description of the present invention it is clear that as compared to the prior-art technology, the present invention has the following beneficial effects:

The system and method of the present invention employ the simulation module to generate the DP-QPSK data flow, which is processed into a data flow and output to the arbitrary waveform generator, the high-speed ADC, the cache memory circuit, and the logic analyzer so as to be turned into a low-speed digital signal that is then processed by the simulation module using signal recovery. The recovered signal is compared to the original signal, thereby realizing testing and evaluation. The disclosed system and method can test a high-speed ADC separately using simple procedures without high costs.

BRIEF DESCRIPTION OF THE DRAWINGS

FIG. 2 is a structural block diagram of a DP-QPSK simulation module of the present invention.

DETAILED DESCRIPTION OF THE INVENTION

Figure 1:
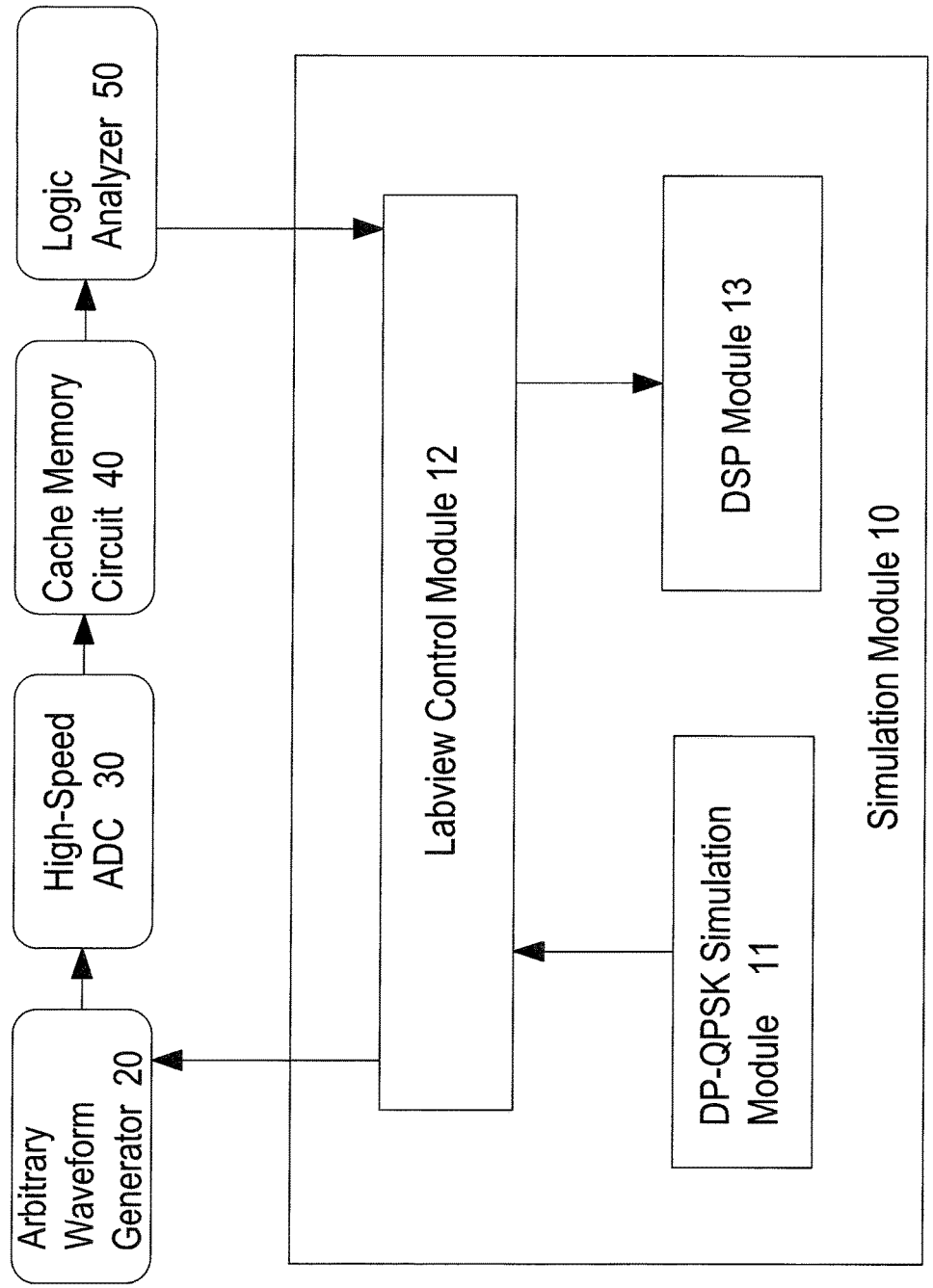
FIG. 1 is a structural block diagram of a system of the present invention.

The invention as well as a preferred mode of use, further objectives and advantages thereof will be described below.

Referring to FIG. 1 and FIG. 2, a system for testing a high-speed ADC in a DP-QPSK receiver comprises: a simulation module 10, an arbitrary waveform generator 20, a high-speed ADC 30, a cache memory circuit 40, and a logic analyzer 50.

The simulation module 10 comprises a DP-QPSK simulation module 11 and a Labview control module 12. The DP-QPSK simulation module 11 serves to generate a DP-QPSK data flow, to perform coupling and phase shift, to output a signal and to receiving a low-speed digital signal for signal recovery and comparison.

Referring to FIG. 2, the DP-QPSK simulation module 11 comprises a signal input unit 14, a local oscillator unit 15, a polarization beam splitter unit, a phase shifter unit, a photodiode unit, and a variable transimpedance amplifier unit. The signal input unit 14 serves to generate the DP-QPSK data flow. The local oscillator unit 15 serves to generate a data flow of the local oscillator laser device. The polarization beam splitter unit comprises two polarization beam splitters 16, connected to the signal input unit 14 and the local oscillator unit 15, respectively, so as to divide each of the DP-QPSK data flow and the local oscillator laser device's data flow into two signals. The phase shifter unit comprises two phase shifters 17. The two phase shifters 17 are connected to the two polarization beam splitters 16, respectively, so as to perform coupling 90° phase shift on the two received signals. The photodiode unit comprises plural photodiodes 18, connected to the output end of the phase shifter 17, respectively, so as to convert optical signals into electric signals. Each of the phase shifters 17 is connected to four photodiodes 18. The variable transimpedance amplifier unit comprises plural variable transimpedance amplifiers 19. Each of the variable transimpedance amplifiers 19 is connected to two photodiodes 18 that are connected to the same phase shifter 17, so as to amplify signals.

The Labview control module 12 serves to realize data communication between the DP-QPSK simulation module 11 and the arbitrary waveform generator 20 as well as the logic analyzer 50. Connection or data exchange between the Labview control module 12 and the arbitrary waveform generator 20, and the logic analyzer 50, and the DP-QPSK simulation module 11 are realized using a GPIB bus, a TCP/IP protocol and a data file, respectively. Since direct data exchange between the Labview control module 12 and the DP-QPSK simulation module 11 is impossible, a data file in the format of .txt or .csv is used to realize data exchange.

The arbitrary waveform generator 20 is connected to the simulation module 10 for receiving the data flow and outputting a high-speed analog signal and a clock signal. Its output end has a pair of analog differential signal outlets and four clock outlets. Each two adjacent said clock outlets have a 90° phase difference therebetween.

The high-speed ADC 30 implements a time-interleaved classification sampling structure and is connected to the arbitrary waveform generator 20. It serves to convert the high-speed analog signal and the clock signal converting into a high-speed digital signal. Since the high-speed ADC 30 has a rather high rate in outputting digital signals, these signals have to be converted into low-speed digital signals and cached for the rear-end logic analyzer 50 to read.

The cache memory circuit 40 is connected to the high-speed ADC 30 and serves to convert the high-speed digital signal into a low-speed digital signal. The cache memory circuit 40 has a parallel-to-serial circuit and a Flash cache. The logic analyzer 50 is connected to the cache memory circuit 40 and serves to send the low-speed digital signal to the simulation module 10. The reading rate of the logic analyzer 50 must be smaller than the maximum reading rate supported by the cache memory circuit 40, and the logic analyzer 50 has a sampling rate greater than a sum of an effective number of bits of the high-speed ADC 30 and a number of chip clocks.

The DP-QPSK simulation module 11 further comprises a DSP module 13. The DSP module 13 exchange data with the Labview control module 12 through a file in the format of .txt or .csv. The DSP module 13 uses an algorithm to provide the received low-speed digital signal with damage compensation and signal recovery, including steps of chromatic dispersion compensation, polarization mode dispersion compensation, depolarization, and signal phase estimation. After DSP algorithm, a recovered signal is obtained and to be compared with the original signal, so as to figure out he bit error ratio.

The present invention also provides a method for testing the high-speed ADC in the DP-QPSK receiver, which comprises the following steps:

1) generating the DP-QPSK data flow, performing coupling and phase shift and outputting the data flow using the DP-QPSK simulation module 11;

2) inputting the data flow into the arbitrary waveform generator 20 for outputting the high-speed analog signal and the clock signal;

3) converting the high-speed analog signal and the clock signal into the high-speed digital signal using the high-speed ADC 30;

4) converting the high-speed digital signal into the low-speed digital signal using the cache memory circuit 40; and 5) sending the low-speed digital signal to the DSP module 13 of the simulation module where signal recovery is performed and the recovered signal is compared to the original signal so as to figure out the bit error ratio as a basis for evaluating the performance of the high-speed ADC 30.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A system for testing a high-speed analog-to-digital converter (ADC) in a Dual-Polarization Quadrature Phase Shift Keying (DP-QPSK) receiver, being characterized in comprising:
a simulation module, for generating a DP-QPSK data flow, performing coupling and phase shift, and outputting a data flow;
an arbitrary waveform generator, connected to the simulation module for receiving the data flow and outputting a high-speed analog signal and a clock signal;
a high-speed ADC, connected to the arbitrary waveform generator, for converting the high-speed analog signal and the clock signal into a high-speed digital signal;
a cache memory circuit, connected to the high-speed ADC, for converting the high-speed digital signal into a low-speed digital signal; and
a logic analyzer, connected to the cache memory circuit, for sending the low-speed digital signal to the simulation module;
wherein the simulation module receives the low-speed digital signal and performs signal recovery and compares a recovered signal to an original signal so as to realize testing.

2. The system of claim 1, wherein the simulation module comprises a DP-QPSK simulation module and a Labview control module, the DP-QPSK simulation module generating the DP-QPSK data flow, performing coupling and phase shift, outputting the data flow, receiving the low-speed digital signal, and performing signal recovery and comparison;
and the Labview control module realizing data communication between the DP-QPSK simulation module and the arbitrary waveform generator as well as the logic analyzer.

3. The system of claim 2, wherein the DP-QPSK simulation module comprises a signal input unit, a local oscillator unit, a polarization beam splitter unit, a phase shifter unit, a photodiode unit, and a variable transimpedance amplifier unit; the signal input unit generating the DP-QPSK data flow; the local oscillator unit generating a data flow of the local oscillator laser device; the polarization beam splitter unit connected to the signal input unit and the local oscillator unit for dividing the DP-QPSK data flow and the data flow of the local oscillator laser device into two signals; the phase shifter unit connected to the polarization beam splitter unit for performing coupling and phase shift on the signals; the photodiode unit connected to the phase shifter unit for converting optical signals into electric signals; and the variable transimpedance amplifier unit connected to the photodiode unit for amplifying the signals.

4. The system of claim 2, wherein connection or data exchange between the Labview control module and the arbitrary waveform generator, and the logic analyzer, and the DP-QPSK simulation module are realized using a General Purpose Interface Bus (GPIB) bus, a Transmission Control Protocol/Internet Protocol (TCP/IP) and a data file, respectively.

5. The system of claim 2, wherein the DP-QPSK simulation module comprises a DSP module for receiving the low-speed digital signal, performing signal recovery, and comparing the recovered signal to the original signal so as to realize testing.

6. The system of claim 1, wherein the arbitrary waveform generator has a pair of analog differential signal outlets and four clock outlets, in which each two adjacent said clock outlets have a 90° phase difference therebetween.

7. The system of claim 1, wherein the logic analyzer has a reading rate smaller than a maximum reading rate supported by the cache memory circuit, and the logic analyzer has a sampling rate greater than a sum of an effective number of bits of the high-speed ADC and a number of chip clocks.

8. The system of claim 1, wherein the cache memory circuit has a parallel-to-serial circuit and a Flash cache.

9. The system of claim 1, wherein the high-speed ADC implements a time-interleaved classification sampling structure.

10. A method for testing the high-speed ADC in the DP-QPSK receiver using the system of claim 1, comprising the steps of:
1) generating the DP-QPSK data flow, performing coupling and phase shift and outputting the data flow using the simulation module;
2) inputting the data flow into the arbitrary waveform generator for outputting the high-speed analog signal and the clock signal;
3) converting the high-speed analog signal and the clock signal into the high-speed digital signal using the high-speed ADC;
4) converting the high-speed digital signal into the low-speed digital signal using the cache memory circuit; and
5) sending the low-speed digital signal to the simulation module where signal recovery is performed and the recovered signal is compared to the original signal so as to realize testing.

* * * * *